(12) United States Patent
Nowicki et al.

(10) Patent No.: US 11,988,305 B2
(45) Date of Patent: May 21, 2024

(54) FLUID CONNECTOR INCLUDING INTERNAL RETAINING CLIP

(71) Applicant: Oetiker NY, Inc., Lancaster, NY (US)

(72) Inventors: Eric Nowicki, Cheektowaga, NY (US); Kristian James Hagen, Gasport, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 17/757,747

(22) PCT Filed: Dec. 19, 2019

(86) PCT No.: PCT/US2019/067399
§ 371 (c)(1),
(2) Date: Jun. 20, 2022

(87) PCT Pub. No.: WO2021/126205
PCT Pub. Date: Jun. 24, 2021

(65) Prior Publication Data
US 2023/0023679 A1    Jan. 26, 2023

(51) Int. Cl.
*F16L 13/16*    (2006.01)
*F16L 37/088*    (2006.01)

(52) U.S. Cl.
CPC .......... *F16L 13/163* (2013.01); *F16L 37/088* (2013.01)

(58) Field of Classification Search
CPC ... F16L 37/088; F16L 37/0887; F16L 13/163; F16L 37/14; F16L 37/148; F16L 37/1225; F16L 37/0885
See application file for complete search history.

(56) References Cited

U.S. PATENT DOCUMENTS

| | | | | |
|---|---|---|---|---|
| 2,521,127 A | * | 9/1950 | Price | F16L 37/088 285/302 |
| 3,540,760 A | | 11/1970 | Miller et al. | |
| 3,995,897 A | * | 12/1976 | Paskert | F16L 37/088 285/902 |
| 4,895,395 A | * | 1/1990 | Ceriani | F16L 37/088 285/39 |
| 4,925,217 A | * | 5/1990 | Ketcham | F16L 37/088 285/319 |
| 5,695,224 A | | 12/1997 | Grenier | |

(Continued)

FOREIGN PATENT DOCUMENTS

| | | |
|---|---|---|
| CN | 1243927 | 2/2000 |
| CN | 1932364 | 3/2007 |

(Continued)

*Primary Examiner* — Matthew Troutman
*Assistant Examiner* — Fannie C Kee
(74) *Attorney, Agent, or Firm* — Harter Secrest & Emery LLP; Michael Nicholas Vranjes

(57) ABSTRACT

A fluid connector, including a connector body, including a first through-bore, a first surface, a second surface, and a flange, a retaining clip operatively arranged to engage the first surface, the retaining clip being radially expandable within the connector body, and a retaining plate arranged to be inserted into the first through-bore, including a distal surface arranged to engage the second surface, a proximal surface, and a second through-bore, wherein the flange is operatively arranged to be crimped radially inward around the retaining plate.

20 Claims, 6 Drawing Sheets

(56) References Cited

U.S. PATENT DOCUMENTS

| | | | |
|---|---|---|---|
| 5,727,821 A * | 3/1998 | Miller | F16L 37/0887 |
| | | | 285/308 |
| 5,730,475 A * | 3/1998 | Kargula | F16L 37/088 |
| | | | 285/308 |
| 5,775,738 A | 7/1998 | Bartholomew | |
| 5,826,920 A * | 10/1998 | Bartholomew | F16L 37/088 |
| | | | 285/305 |
| 5,927,761 A | 7/1999 | Bartholomew | |
| 5,988,705 A * | 11/1999 | Norkey | F16L 37/088 |
| | | | 251/149.6 |
| 6,086,113 A | 7/2000 | Bartholomew | |
| 6,913,292 B2 | 7/2005 | Snyder, Sr. et al. | |
| 7,021,672 B2 | 4/2006 | Ericksen et al. | |
| 7,121,593 B2 | 10/2006 | Snyder, Sr. et al. | |
| 7,445,247 B2 | 11/2008 | Ericksen et al. | |
| 7,500,699 B2 | 3/2009 | Snyder, Sr. et al. | |
| 7,914,050 B2 * | 3/2011 | Udhofer | F16L 37/0887 |
| | | | 285/321 |
| 7,954,861 B2 | 6/2011 | Swift et al. | |
| 8,274,000 B2 | 9/2012 | Smith | |
| 8,487,197 B2 | 7/2013 | Smith | |
| 8,491,012 B2 | 7/2013 | LeQuere | |
| 9,429,262 B2 | 8/2016 | Ericksen et al. | |
| 9,604,404 B2 | 3/2017 | Ericksen et al. | |
| 9,746,114 B2 | 8/2017 | Le Quere | |
| 2007/0052237 A1 | 3/2007 | Udhofer et al. | |
| 2008/0136178 A1 | 6/2008 | Udhofer et al. | |
| 2010/0314863 A1 * | 12/2010 | Ohara | F16L 37/163 |
| | | | 285/31 |
| 2011/0138605 A1 | 6/2011 | Swift et al. | |
| 2016/0334040 A1 * | 11/2016 | Ehrke | F16L 37/088 |

FOREIGN PATENT DOCUMENTS

| | | | |
|---|---|---|---|
| CN | 101802477 | 8/2010 | |
| EP | 0187608 | 4/1990 | |
| EP | 0757201 A1 * | 2/1997 | F16L 37/088 |
| KR | 20120002435 U * | 4/2012 | F16L 37/088 |
| WO | WO-9707357 A1 * | 2/1997 | F16L 37/088 |

* cited by examiner

FLUID CONNECTOR INCLUDING INTERNAL RETAINING CLIP

FIELD

The present disclosure relates to fluid connectors, and, more particularly, to a fluid connector including an internal retaining clip that eliminates the need for post-process machining of a connector body and ensures that the retaining clip is always contained.

BACKGROUND

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube end form when the tube end form is fully inserted into the connector body. However, in order for the fluid connector to properly function, slots or apertures must be machined in the connector body such that the retaining clip can protrude therethough and engage the tube end form, which requires extra post-process manufacturing. Additionally, during the assembly process, installation of the retaining clip onto the connector body is difficult and failure to install the retaining clip properly can jeopardize the structural integrity of the retaining clip. Furthermore, since the retaining clips are very thin and small, it is easy to lose them if dropped or misplaced.

Thus, there has been a long-felt need for a fluid connector including an internal retaining clip that eliminates the need for post-process machining, contains the retaining clip, and reduces the insertion force required to assemble the fluid connector.

SUMMARY

According to aspects illustrated herein, there is provided a fluid connector, comprising a connector body, including a first through-bore, a first surface, a second surface, and a flange, a retaining clip operatively arranged to engage the first surface, the retaining clip being radially expandable within the connector body, and a retaining plate arranged to be inserted into the first through-bore, including a distal surface arranged to engage the second surface, a proximal surface, and a second through-bore, wherein the flange is operatively arranged to be crimped radially inward around the retaining plate.

According to aspects illustrated herein, there is provided a fluid connector, comprising a connector body, including a first through-bore, a first surface, a second surface, and a flange, a retaining clip operatively arranged to engage the first surface, and a retaining plate operatively arranged to secure the retaining clip in the connector body, the retaining plate including a distal surface arranged to engage the second surface, a proximal surface, a second through-bore, and a protrusion operatively arranged to engage the retaining clip and prevent rotation of the retaining clip within the connector body, wherein the flange is operatively arranged to be crimped radially inward around the retaining plate.

According to aspects illustrated herein, there is provided a fluid connector, comprising a connector body, including a first through-bore, a first axial facing surface, a second axial facing surface, and a flange, a retaining clip operatively arranged between the first axial facing surface and the second axial facing surface, a retaining plate including a second through-bore operatively arranged to secure the retaining clip in the connector body, wherein the flange is operatively arranged to be crimped radially inward to secure the retaining plate to the connector body, and a tube end form operatively arranged to be fluidly connected to the connector body via the retaining clip.

According to aspects illustrated herein, there is provided a fluid connector including a connector body including a retaining clip, a retaining plate, and a tube end form that reduces the insertion force required to assemble a tube end form into the connector body as well as reduces the overall length of the connector body. The arrangement of the internal clip within the connector body addresses ergonomic concerns at assembly plants as it allows for ease of assembly from all assembly positions. The design of the connector body with the internal retaining clip also addresses requirements for more compact connector bodies due to the decreasing packaging space. In addition, the fluid connector allows for assembly of the retaining clip within the connector body without having to stretch or radially expand the retaining clip and without the need for post-process machining of the connector body, thereby reducing debris. A flange of the connector body is crimped down over the retaining plate thereby ensuring a secure retaining clip.

In some embodiments, the retaining clip is arranged in a slot of the connector body on a first landing. The retaining plate is then arranged in a slot of the connector body on a second landing, thereby enclosing the retaining clip within the slot. A flange of the connector body is then crimped, swaged, or folded radially inward and secures the retaining plate, and retaining clip, within the connector body. In some embodiments, the retaining plate comprises one or more projections which engage the retaining clip and prevent rotation of retaining clip. This allows for easier disassembly of the fluid connector (i.e., allows for easier removal of the retainer clip from the connector body using a disconnect tool).

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
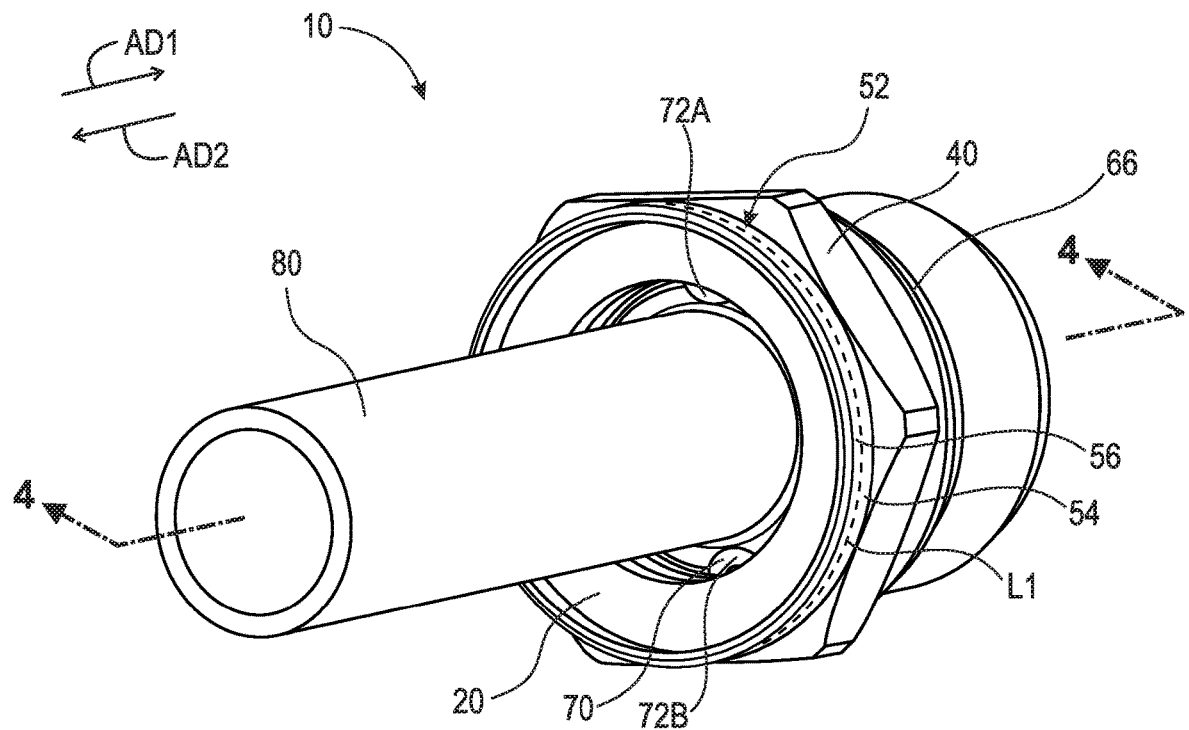
FIG. 1 is a front perspective view of a fluid connector, in an unsecured state.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 2:
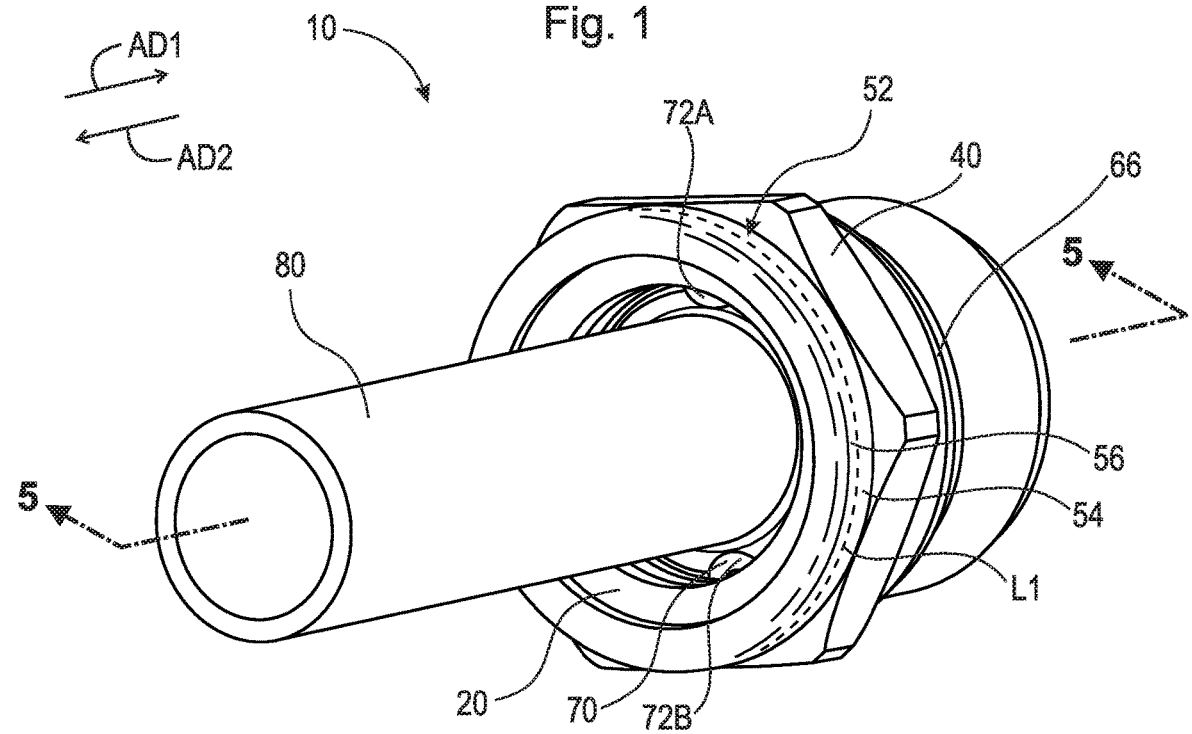
FIG. 2 is a front perspective view of the fluid connector shown in FIG. 1, in a secured state.
Figure 3:
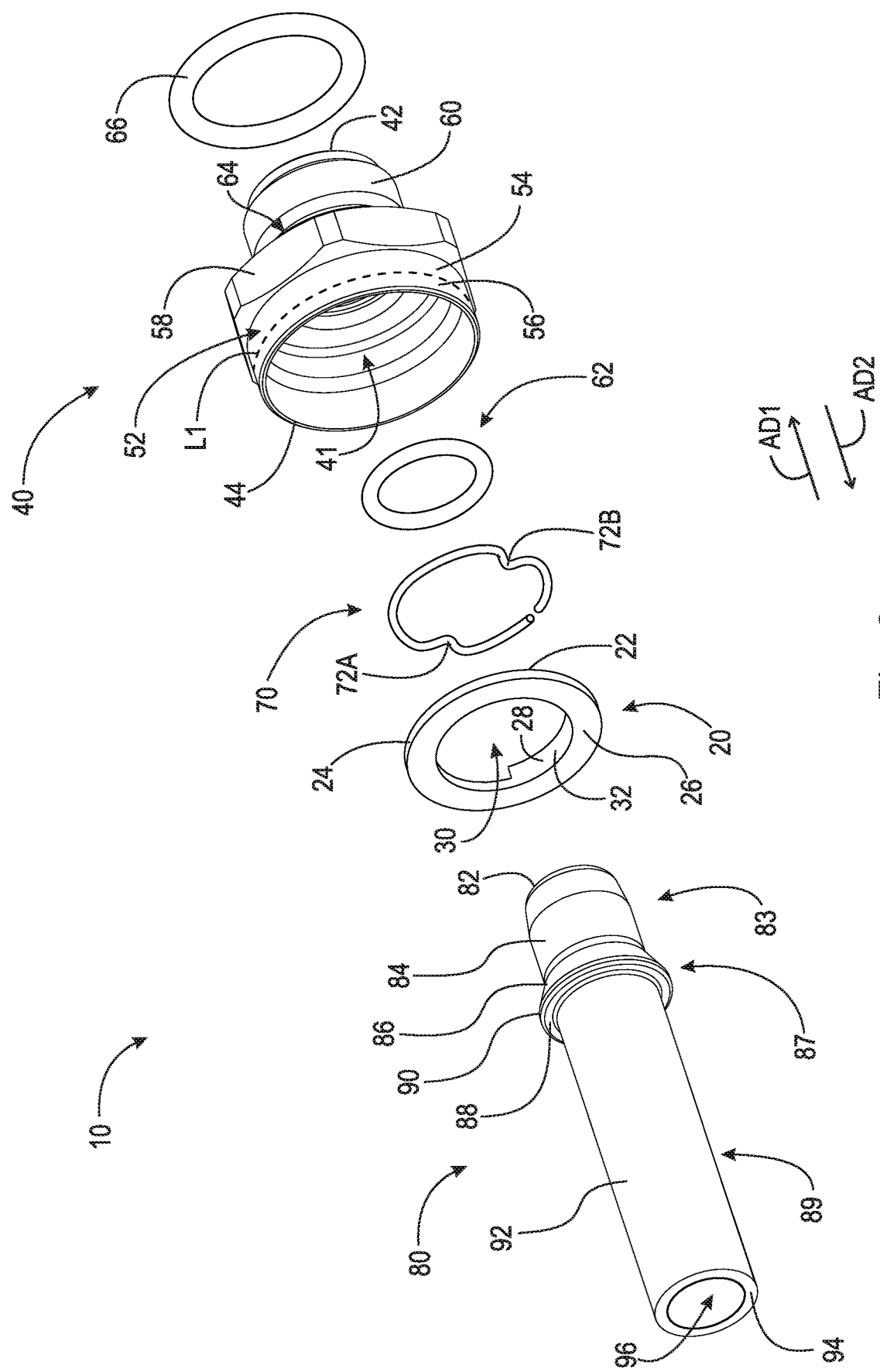
FIG. 3 is a front exploded perspective view of the fluid connector shown in FIG. 1.
Figure 4:
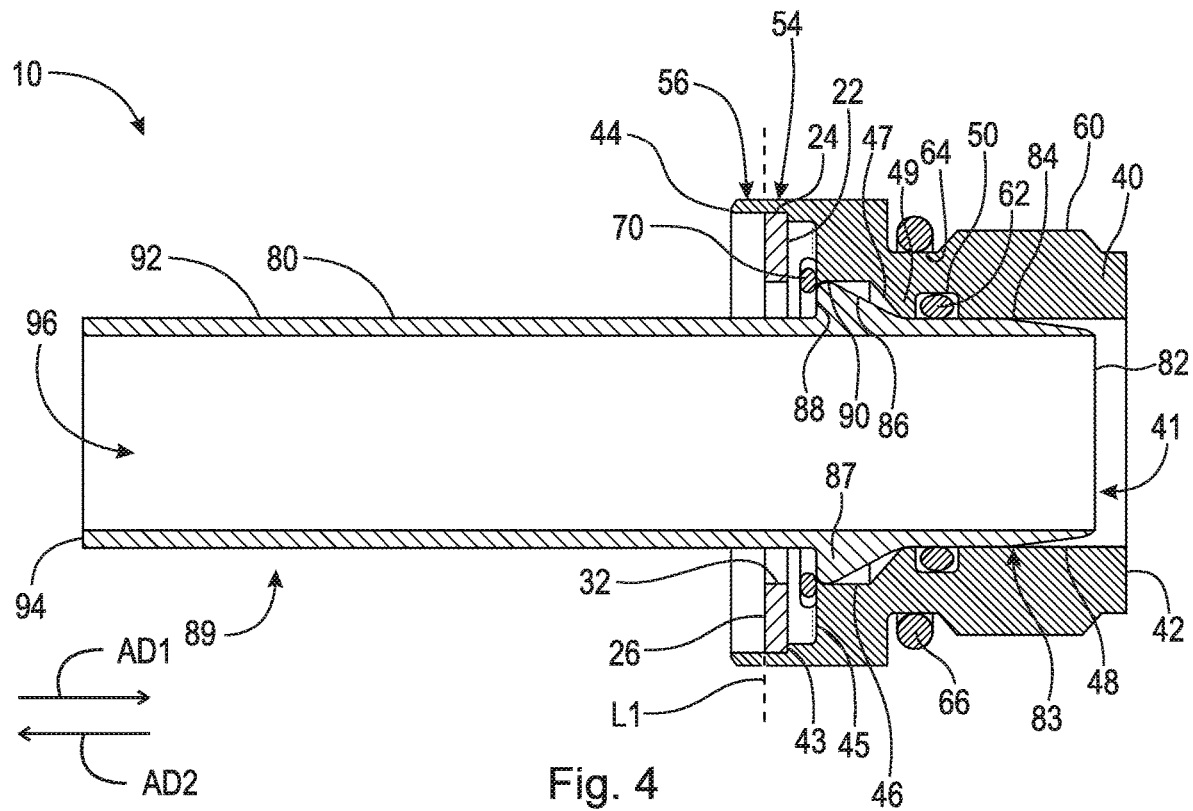
FIG. 4 is a cross-sectional view of the fluid connector taken generally along line 4-4 in FIG. 1.
Figure 5:
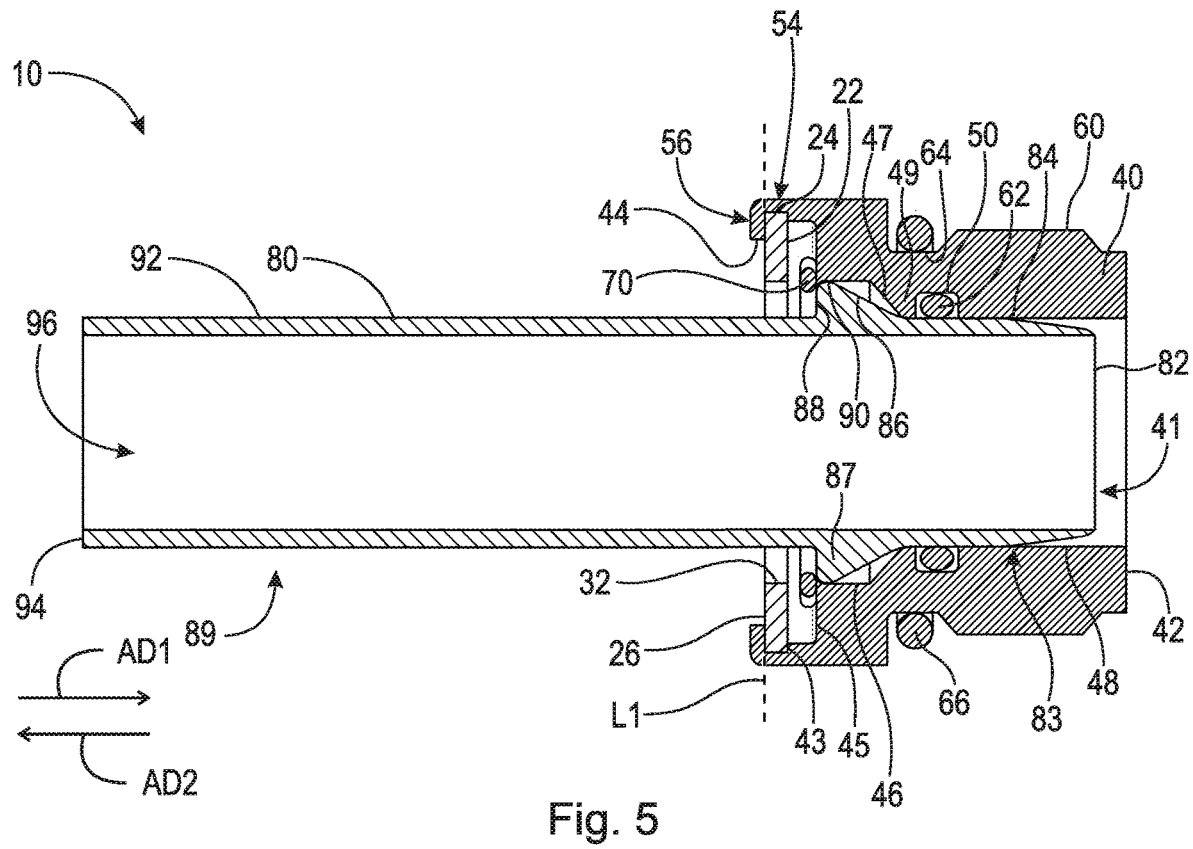
FIG. 5 is a cross-sectional view of the fluid connector taken generally along line 5-5 in FIG. 2.

Adverting now to the figures, FIG. 1 is a front perspective view of fluid connector 10, in an unsecured state. FIG. 2 is a front perspective view of fluid connector 10, in a secured state. FIG. 3 is a front exploded perspective view of fluid connector 10. FIG. 4 is a cross-sectional view of fluid connector 10 taken generally along line 4-4 in FIG. 1. FIG. 5 is a cross-sectional view of fluid connector 10 taken generally along line 5-5 in FIG. 2. Fluid connector 10 generally comprises retaining plate 20, connector body 40, and tube end form 80. For the purposes of the present disclosure, "unsecured state" is intended to mean that flange 52 of connector body 40 has not yet been crimped over retaining plate 20 (or retaining clip 70, 170). "Secured state" is intended to mean that section 56 of flange 52 has been crimped over retaining plate 20 thereby securing retaining plate 20 and retaining clip 70 (or 170) within connector body 40. The following description should be read in view of FIGS. 1-5.

Connector body 40 comprises through-bore 41 extending from end 42 to end 44, radially inward facing surface 46, radially inward facing surface 48, protrusion 47, groove 50, flange 52, head 58, and radially outward facing surface 60. Connector body 40 is arranged to be connected to a component that is filled with a fluid. For example, connector body 40 may be connected to a transmission via radially outward facing surface 60, which may comprise external threading. Connector body 40 may be screwed into a threaded hole in the transmission via head 58 (e.g., using a wrench), which is then filled with transmission fluid. In some embodiments, head 58 is hexagonal; however, it should be appreciated that head 58 may comprise any geometry suitable for applying torque to connector body 40 (e.g., square, triangular, octagonal, etc.). Another component in which fluid connector 10, specifically connector body 40, may be installed into is an engine block. It should be appreciated that fluid connector 10 may be used in various other components, assemblies, and subassemblies in which fluid connection is desired. Radially outward facing surface 60 may further comprise groove 64. Seal or O-ring 66 may be arranged in groove 64 to create a fluid tight seal between connector body 40 and the component it is connected to. Seal 62 is arranged in connector body 40. Specifically, seal 62 is arranged in groove 50. In some embodiments, seal 62 is an O-ring. In some embodiments, connector body 40 further comprises protrusion 49, which encloses seal 62 within groove 50 and forms radially inward facing surface 47. Radially inward facing surface 47 extends between and is connected to radially inward facing surface 46 and radially inward facing surface 48. Surface 47 is operatively arranged to engage tube end form 80. Specifically, protrusion 49 engages shoulder 87 to prevent displacement of tube end form 80 in axial direction AD1. Connector body 40 further comprises surface 45 and surface 43. Surface 45 is connected to and extends from radially inward facing surface 46 and surface 43. Surface 45 along with retaining plate 20 forms a space in which retaining clip 70, 170 is enclosed, as will be described in greater detail below. Surface 43 is connected to and extends from flange 52. Surface 43 is arranged to engage surface 22 of retaining plate 20. In some embodiments, surfaces 43 and 45 are axially facing surface and are substantially parallel to each other (e.g., surfaces 43 and 45 both face in axial direction AD2). Flange 52 extends from head 58, and surface 43, in axial direction AD2. Flange 52 comprises section 54 and section 56, which are shown in the figures as being separated by fold line L1. It should be appreciated that fold line L1 is an imaginary line used solely for the purposes of describing the folding action of flange 52 herein. In some embodiments, connector body 40 comprises a metal. In some embodiments, connector body 40 comprises a polymer with flange 52 comprising a suitable malleable material. In some embodiments, connector body 40 comprises a ceramic with flange 52 comprising a suitable malleable material.

Tube end form 80 comprises end 82, section 83, shoulder 87, section 89, end 94, and through-bore 96. Through-bore 96 extends through tube end form 80 from end 82 to end 94. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical taper proximate end 82 (see FIGS. 4-5). Shoulder 87 is arranged between section 83 and section 89 and comprises radially outward facing surface 86, radially outward facing surface 90, and surface 88. As shown, radially outward facing surface 86 is a frusto-conical surface extending from radially outward surface 84 to radially outward facing surface 90. Radially outward facing surface 86 increases in diameter is axial direction AD2. In some embodiments, radially outward facing surface 86 is an axial surface facing at least partially in axial direction AD1. Radially outward facing surface 90 extends from radially outward facing surface 86 to shoulder surface 88. In some embodiments, radially outward facing surface 90 comprises a constant diameter. In some embodiments, radially outward facing surface 90 comprises a variable diameter. Shoulder surface 88 is an axial surface facing at least partially in axial direction AD2. Section 89 is arranged between shoulder 87 and end 94 and comprises radially outward facing surface 92. Radially outward facing surface 92 includes a substantially constant diameter. Tube end form 80 is arranged to be inserted, specifically with end 82 first, into connector body 40 and retaining plate 20. Tube end form 80 is inserted into connector body 40 and retaining plate 20 until retaining clip 70 snaps over shoulder 87. It is the engagement of protrusions 72A-B with shoulder surface 88 that secures tube end form 80 within connector body 40. It should be appreciated that tube end form 80 may be any traditional tube end form comprising a bead, radially outward extending protrusion or flange, or ramp profile, which extends radially outward and axially on the outer surface of the tube end form, to displace a retaining ring, snap ring, or wire clip within the connector body (and cartridge) to secure the tube end form within the connector body. In some embodiments, tube end form 80 comprises a metal. In some embodiments, tube end form 80 comprises a polymer. In some embodiments, tube end form 80 comprises a ceramic.

Figure 6:
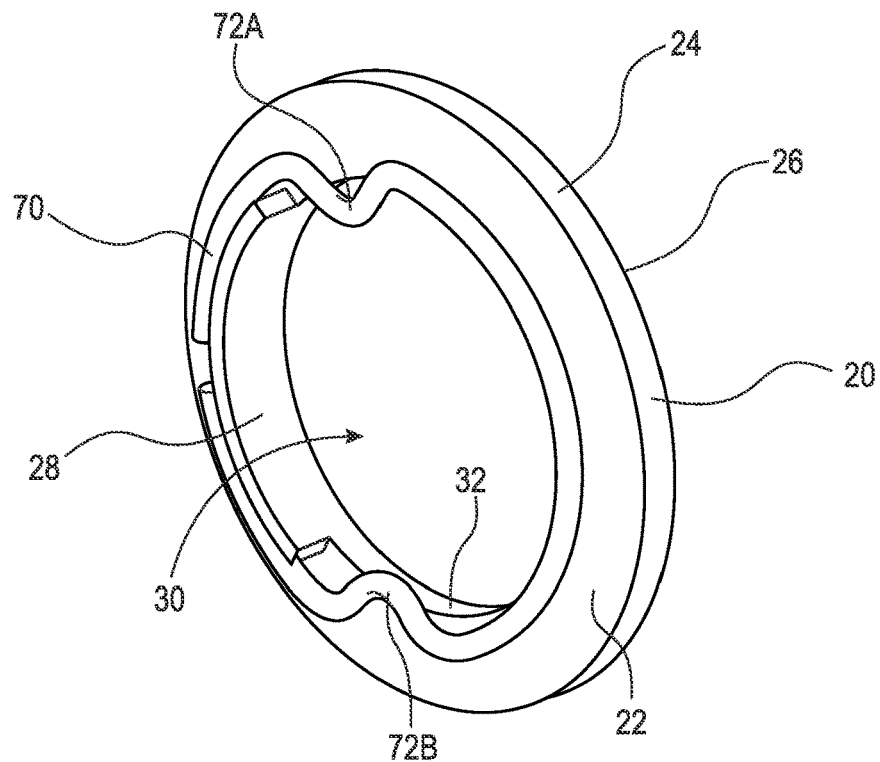
FIG. 6 is a rear perspective view of the retaining clip assembled on the retaining plate.
Figure 7:
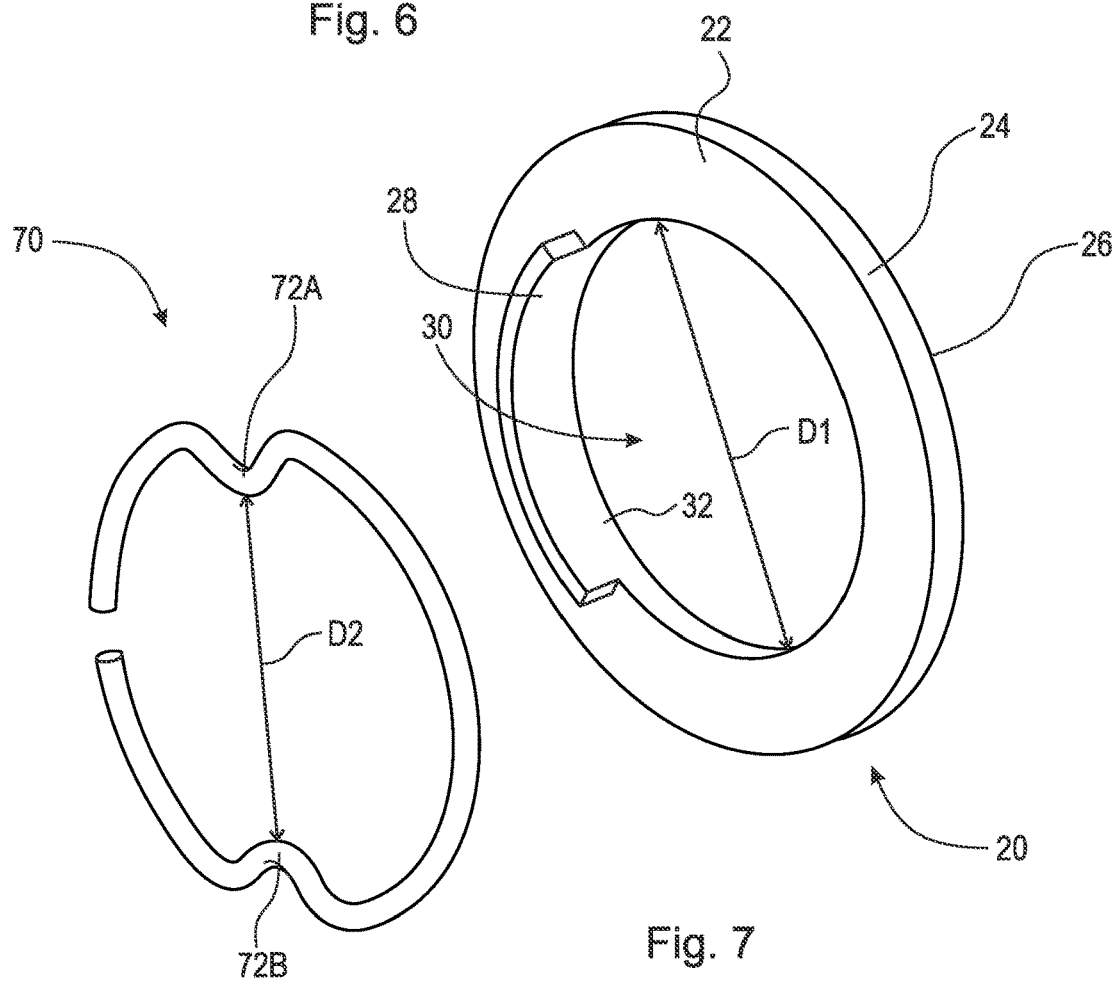
FIG. 7 is a rear exploded perspective view of the retaining clip and the retaining plate shown in FIG. 6.

FIG. 6 is a rear perspective view of retaining clip 70 assembled on retaining plate 20. FIG. 7 is a rear exploded view of retaining clip 70 and retaining plate 20 shown in FIG. 6. The following description should be read in view of FIGS. 1-7.

Retaining clip (or retaining ring or snap clip/ring) 70 is arranged in connector body 40 proximate to surface 45. Surface 45 prevents displacement of retaining clip 70 in axial direction AD1. Retaining clip 70 is generally a retaining ring including one or more protrusions extending radially inward. In the embodiment shown, retaining clip 70 comprises protrusions 72A-B. Protrusions 72A-B are arranged to engage shoulder 87, specifically, shoulder surface 88, to secure tube end form 80 within connector body 40. Retaining clip 70 may comprise any material that is capable of elastically deforming and returning to its original shape (e.g., metal, polymer, etc.).

Retaining plate 20 is operatively arranged to enclose retaining clip 70 within connector body 40. Retaining plate 20 comprises end 22, radially outward facing surface 24, end 26, and through-bore 30. Through-bore 30 forms radially inward facing surface 32. Surface 22 is arranged to engage or abut against surface 43 of connector body 40, proximate radially outward facing surface 24. Radially outward facing surface 24 engages with or is arranged proximate to flange 52. Retaining plate 20 is operatively arranged to be inserted, with surface 22 first, into through-bore 41 at end 44 of connector body and secured therein. Once retaining plate 20 is properly arranged in connector body 40, flange 52 is crimped or bent radially inward such that section 56 is arranged proximate to or abuts against surface 26, thereby securing retaining plate 20 to connector body 40 (as shown in FIG. 5). In some embodiments, retaining plate 20 further comprises one or more projections (e.g., projection 28) extending from surface 22. When retaining plate 20 is assembled in connector body 40, projection 28 extends in axial direction AD1 and engages with retaining clip 70 to prevent rotation of retaining clip 70 within connector body 40 (see engagement of retaining clip 70 and retaining plate 20 shown in FIG. 6). For example, protrusion 28 may engage a section of retaining clip 70 arranged circumferentially between protrusions 72A and 72B. Through-bore 30 has diameter D1. In an unexpanded state, protrusions 72A and 72B of retaining clip 70 are separated by a distance D2, which is less than diameter D1. As such, when retaining clip 70 is engaged with retaining plate 20, protrusions 72A and 72B extend radially inward from radially inward facing surface 32 and thus into through-bore 30. Such arrangement allows protrusions 72A-B to engage with shoulder 87 of tube end form 80. In some embodiments, retaining plate 20 comprises a metal. In some embodiments, retaining plate 20 comprises a polymer. In some embodiments, retaining plate 20 comprises a ceramic.

To assemble fluid connector 10, retaining clip 70 is inserted into connector body 40. As shown in FIGS. 4-5, retaining clip 70 is arranged in the cavity formed axially between surface 45 and surface 47. Retaining plate 20 is then inserted into connector body 40. Surface 22 of retaining plate 20 engages surface 43 of connector body 40 thereby enclosing retaining clip 70 within connector body 40. In some embodiments, projection 28 engages retaining clip 70 as previously described. Radially outward facing surface 24 is arranged proximate to or engages with flange 52. Flange 52 is then crimped radially inward to secure retaining plate 20 within connector body 40, as shown in FIG. 5. Specifically, section 56 is crimped or bent radially inward about bend line L1, until section 56 is arranged proximate to or abuts against end 26 of retaining clip 20. In the secured state as shown in FIG. 5, retaining clip 20 is prevented from displacement in axial direction AD1 by surface 43 and axial direction AD2 by crimped section 56. As such, retaining clip 70 is prevented from displacement in axial direction AD1 by surface 45 and axial direction AD2 by surface 22. In some embodiments, once flange 52 is crimped over retaining plate 20, retaining plate 20 is non-rotatably connected to connector body 40. In some embodiments, once flange 52 is crimped over retaining plate 20, retaining plate 20 is rotatably connected to connector body 40. It should be appreciated that tube end form 80 is not inserted into retaining plate 20 and connector body 40 until flange 52 has been crimped and retaining plate 20 and retaining clip 70 are secured in connector body 40. FIG. 4 shows tube end form 80 inserted into retaining plate 20 and connector body 40 in an unconnected state only to further illustrate the interaction and orientation of the components. However, tube end form 80 would not be present during the assembly of retaining plate 20, retaining clip 70, and connector body 40.

Figure 8:
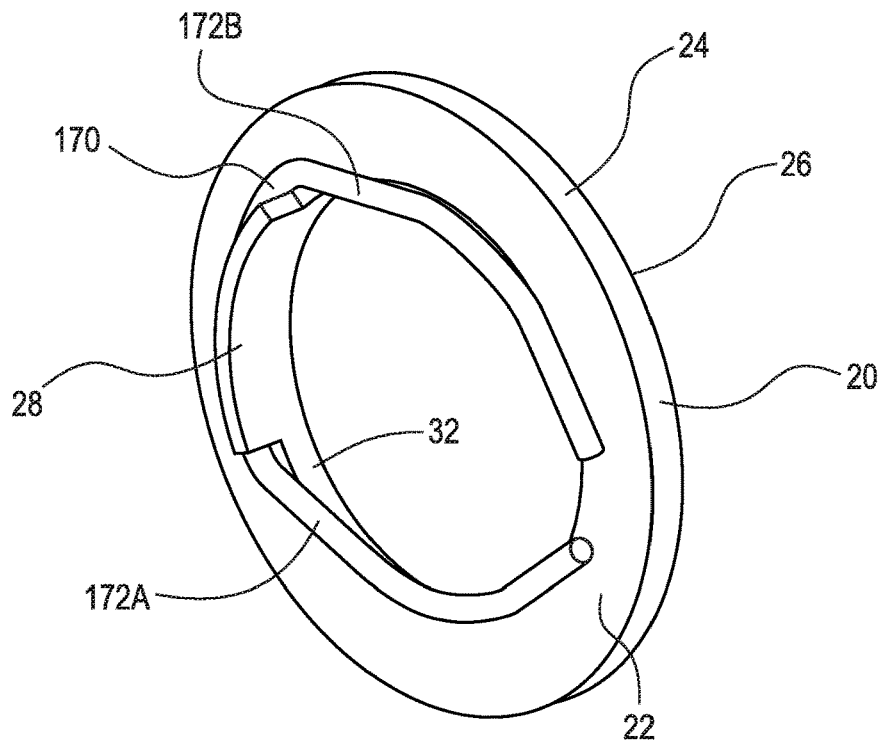
FIG. 8 is a rear perspective view of a retaining clip assembled on a retaining plate.
Figure 9:
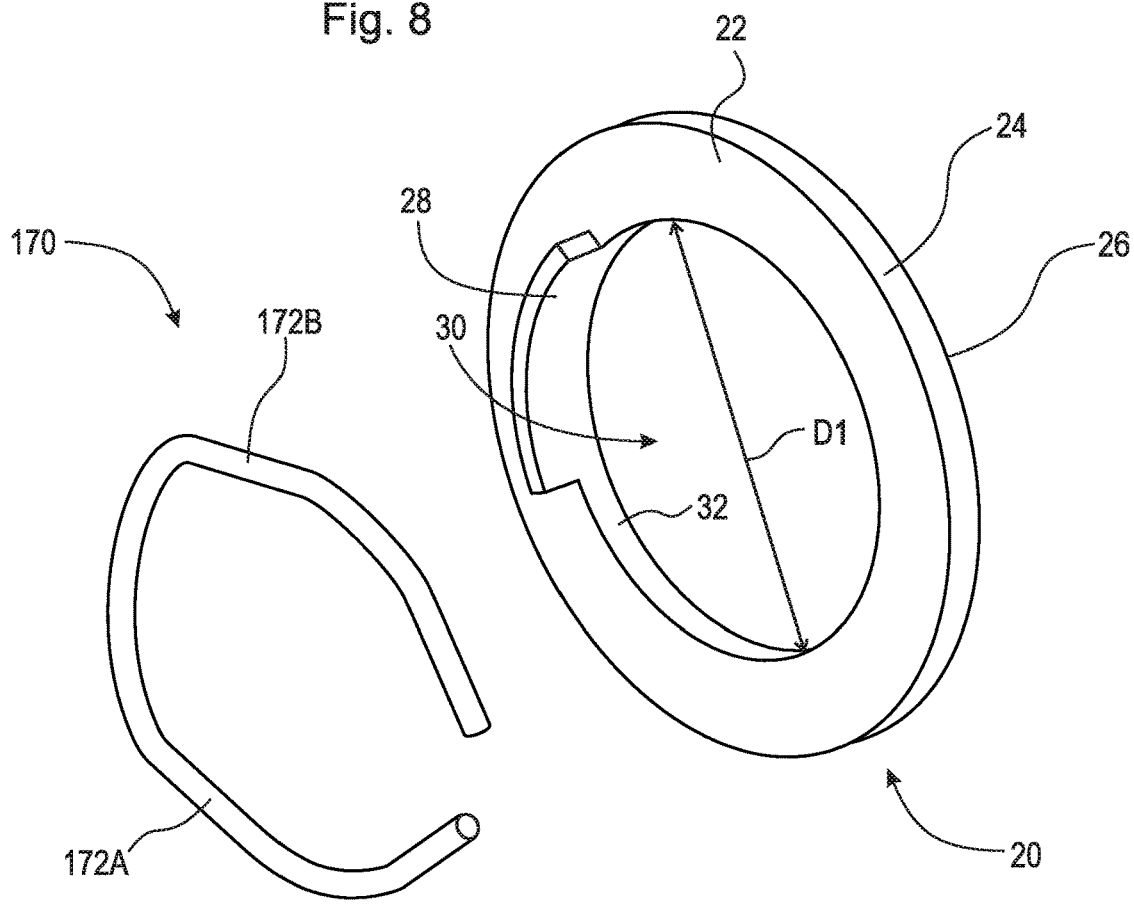
FIG. 9 is a rear exploded perspective view of the retaining clip and the retaining plate shown in FIG. 8.
Figure 10:
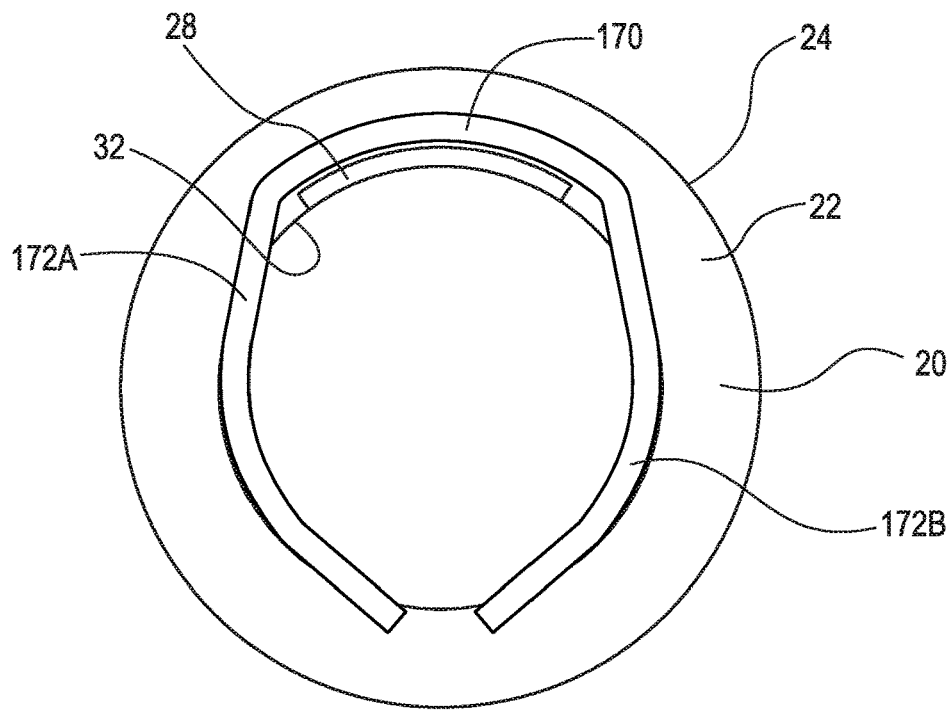
FIG. 10 is a rear elevational view of the retaining clip assembled on the retaining plate shown in FIG. 8; and, FIG. 11 is a front elevational view of the retaining clip assembled on the retaining plate shown in FIG. 8.
Figure 11:
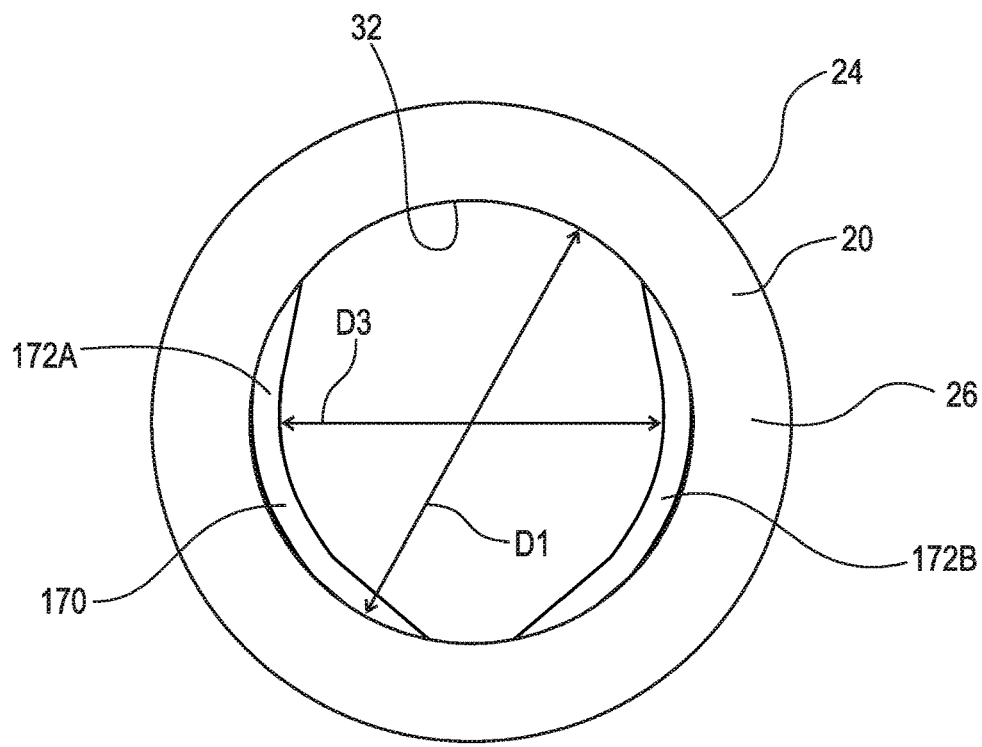

FIG. 8 is a rear perspective view of retaining clip 170 assembled on retaining plate 20. FIG. 9 is a rear exploded perspective view of retaining clip 170 and retaining plate 20. FIG. 10 is a rear elevational view of retaining clip 170 assembled on retaining plate 20. FIG. 11 is a front elevational view of retaining clip 170 assembled on retaining plate 20. The following description should be read in view of FIGS. 1-5 and 8-11.

Retaining clip (or retaining ring or snap clip/ring) 170 is arranged in connector body 40 proximate to surface 45. Surface 45 prevents displacement of retaining clip 170 in axial direction AD1. Retaining clip 170 is generally a retaining ring including one or more arms extending radially inward from an outer circumference. In the embodiment shown, retaining clip 170 comprises arms 172A-B. Arms 172A-B are arranged to engage shoulder 87, specifically, shoulder surface 88, to secure tube end form 80 within connector body 40. Retaining clip 170 may comprise any material that is capable of elastically deforming and returning to its original shape (e.g., metal, polymer, etc.).

Retaining plate 20 is operatively arranged to enclose retaining clip 170 within connector body 40. Retaining plate 20 comprises end 22, radially outward facing surface 24, end 26, and through-bore 30. Through-bore 30 forms radially inward facing surface 32. Surface 22 is arranged to engage or abut against surface 43 of connector body 40, proximate radially outward facing surface 24. Radially outward facing surface 24 engages with or is arranged proximate to flange 52. Retaining plate 20 is operatively arranged to be inserted, with surface 22 first, into through-bore 41 at end 44 of connector body and secured therein. Once retaining plate 20 is properly arranged in connector body 40, flange 52 is crimped or bent radially inward such that section 56 is arranged proximate to or abuts against surface 26, thereby securing retaining plate 20 to connector body 40 (as shown in FIG. 5). In some embodiments, retaining plate 20 further comprises one or more projections (e.g., projection 28) extending from surface 22. When retaining plate 20 is assembled in connector body 40, projection 28 extends in axial direction AD1 and engages with retaining clip 170 to prevent rotation of retaining clip 170 within connector body 40 (see engagement of retaining clip 170 and retaining plate 20 shown in FIGS. 8 and 10). For example, protrusion 28 may engage a section of retaining clip 170 arranged circumferentially between arms 172A and 172B. Through-bore 30 has diameter D1. In an unexpanded state, arms 172A and 172B of retaining clip 170 are separated by a distance D3, which is less than diameter D1. As such, when retaining clip 170 is engaged with retaining plate 20, arms 172A and 172B extend radially inward from radially inward facing surface 32 and thus into through-bore 30. Such arrangement allows protrusions 72A-B to engage with shoulder 87 of tube end form 80.

To assembly fluid connector 10, retaining clip 170 is inserted into connector body 40. Retaining clip 170 is arranged in the cavity formed axially between surface 45 and surface 47. Retaining plate 20 is then inserted into connector body 40. Surface 22 of retaining plate 20 engages surface 43 of connector body 40 thereby enclosing retaining clip 170 within connector body 40. In some embodiments, projection 28 engages retaining clip 170 as previously described. Radially outward facing surface 24 is arranged proximate to or engages with flange 52. Flange 52 is then crimped radially inward to secure retaining plate 20 within connector body 40, as shown in FIG. 5. Specifically, section 56 is crimped or bent radially inward about bend line L1, until section 56 is arranged proximate to or abuts against end 26 of retaining clip 20. In the secured state as shown in FIG. 5, retaining clip 20 is prevented from displacement in axial direction AD1 by surface 43 and axial direction AD2 by crimped section 56. As such, retaining clip 170 is prevented from displacement in axial direction AD1 by surface 45 and axial direction AD2 by surface 22.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Fluid connector
20 Retaining plate
22 Surface
24 Radially outward facing surface
26 Surface
28 Projection
30 Through-bore
32 Radially inward facing surface
40 Connector body
41 Through-bore
42 End
43 Surface
44 End 45 Surface
46 Radially inward facing surface
47 Radially inward facing surface
18 Radially inward facing surface
49 Protrusion
50 Groove
52 Flange
56 Section
58 Section
58 Head
60 Radially outward facing surface
62 Seal
64 Groove
66 Seal
70 Retaining clip
72A Protrusion
72B Protrusion
80 Tube end form
82 End
83 Section
84 Radially outward facing surface
86 Radially outward facing surface
87 Shoulder
88 Surface
89 Section
90 Radially outward facing surface
92 Radially outward facing surface
94 End
96 Through-bore
170 Retaining clip
172A Arm
172B Arm
L1 Line
D1 Diameter
D2 Diameter
D3 Diameter
AD1 Axial direction
AD2 Axial direction

What is claimed is:

1. A fluid connector, comprising:
a connector body, including:
   a first through-bore;
   a first surface facing in a first axial direction;
   a second surface facing in the first axial direction; and
   a flange;
a retaining clip operatively arranged to engage the first surface, the retaining clip being radially expandable within the connector body; and
a retaining plate arranged to be inserted into the first through-bore, including:
   a distal surface arranged to engage the second surface;
   a proximal surface; and
   a second through-bore;
wherein:
   the flange is operatively arranged to be crimped radially inward around the retaining plate.

2. The fluid connector as recited in claim 1, wherein the flange comprises a first section and a second section, and the second section is operatively arranged to be crimped radially inward to secure the retaining plate in the connector body and form a connected state.

3. The fluid connector as recited in claim 2, wherein:
in an unconnected state, the second section is substantially aligned with the first section; and
in the connected state, the second section is substantially perpendicular to the first section and is engaged with the proximal surface.

4. The fluid connector as recited in claim 2, wherein in the connected state, the retaining plate is non-rotatably connected to the connector body.

5. The fluid connector as recited in claim 1, wherein the retaining plate further comprises at least one projection that extends from the distal surface, the at least one projection operatively arranged to engage the retaining clip.

6. The fluid connector as recited in claim 5, wherein in a connected state, the retaining plate and the retaining clip are non-rotatably connected to the connector body.

7. The fluid connector as recited in claim 1, wherein the retaining clip is arranged axially between the first surface and the second surface.

8. The fluid connector as recited in claim 1, further comprising a tube end form, the tube end form being securable in the connector body.

9. The fluid connector as recited in claim 8, wherein the retaining clip is operatively arranged to secure the tube end form to the connector body.

10. The fluid connector as recited in claim 8, wherein the connector body further comprises a protrusion operatively arranged to engage a shoulder of the tube end form.

11. A fluid connector, comprising:
a connector body, including:
   a first through-bore;
   a first surface;
   a second surface; and
   a flange;
a retaining clip operatively arranged to engage the first surface; and
a retaining plate operatively arranged to secure the retaining clip in the connector body, the retaining plate including:
   a distal surface arranged to engage the second surface;
   a proximal surface;
   a second through-bore; and
   a protrusion operatively arranged to engage the retaining clip and prevent rotation of the retaining clip within the connector body;
wherein the flange is operatively arranged to be crimped radially inward around the retaining plate.

12. The fluid connector as recited in claim 11, wherein the flange comprises a first section and a second section, and the second section is operatively arranged to be crimped radially inward to secure the retaining plate in the connector body and form a connected state.

13. The fluid connector as recited in claim 12, wherein:
in an unconnected state, the second section is substantially aligned with the first section; and
in the connected state, the second section is substantially perpendicular to the first section and is engaged with the proximal surface.

14. The fluid connector as recited in claim 11, wherein the retaining clip is radially expandable within the connector body.

15. The fluid connector as recited in claim 11, wherein the retaining clip is arranged axially between the first surface and the second surface.

16. The fluid connector as recited in claim 11, further comprising a tube end form, the tube end form being securable in the connector body.

17. The fluid connector as recited in claim 16, wherein the retaining clip is operatively arranged to secure the tube end form to the connector body.

18. The fluid connector as recited in claim 16, wherein the connector body further comprises a protrusion operatively arranged to engage a shoulder of the tube end form.

19. The fluid connector as recited in claim 11, wherein at least a portion of the retaining clip, in an unexpanded state, extends radially into the second through-bore.

20. A fluid connector, comprising:
- a connector body, including:
  - a first through-bore;
  - a first axial facing surface;
  - a second axial facing surface; and
  - a flange;
- a retaining clip operatively arranged between the first axial facing surface and the second axial facing surface;
- a retaining plate including a second through-bore operatively arranged to secure the retaining clip in the connector body, wherein the flange is operatively arranged to be crimped radially inward to secure the retaining plate to the connector body;
- a tube end form operatively arranged to be fluidly connected to the connector body via the retaining clip; and
- wherein the connector body further comprises a protrusion operatively arranged to engage a shoulder of the tube end form.

\* \* \* \* \*